Oct. 26, 1971　　　　　　E. H. ROTTMILLER　　　　　3,614,825
METHOD FOR FABRICATING A MEMBRANE ASSEMBLY
Filed March 17, 1969　　　　　　　　　　　　2 Sheets-Sheet 1

INVENTOR
EDMUND H. ROTTMILLER

ATTYS.

Oct. 26, 1971  E. H. ROTTMILLER  3,614,825

METHOD FOR FABRICATING A MEMBRANE ASSEMBLY

Filed March 17, 1969  2 Sheets-Sheet 2

INVENTOR
EDMUND H. ROTTMILLER

Anderson, Luedeka, Fitch, Even, & Tabin
ATTYS.

United States Patent Office 3,614,825
Patented Oct. 26, 1971

3,614,825
METHOD FOR FABRICATING A MEMBRANE ASSEMBLY
Edmund H. Rottmiller, San Diego, Calif., assignor to Stromberg Datagraphix Inc., San Diego, Calif.
Filed Mar. 17, 1969, Ser. No. 807,862
Int. Cl. B23p *17/00*
U.S. Cl. 29—423
18 Claims

ABSTRACT OF THE DISCLOSURE

A method is described for fabricating a thin membrane supported at its periphery by a mounting frame, wherein the membrane is deposited on a substrate, the frame is secured to the membrane, and the substrate is subsequently etched away. Also described is a membrane assembly which may be constructed in accordance with the method of the invention.

---

This invention relates generally to the fabrication of thin membranes and, more particularly, to a method for fabricating a thin membrane supported at its periphery by a mounting frame, and to an improved membrane assembly.

Certain types of cathode ray tubes use thin membranes to provide storage surfaces, highly emissive surfaces, dielectric surfaces, reflective surfaces, etc. Generally, such membranes are continuous, that is, form an unbroken surface, for a diameter of, for example, about 1 to 3 inches, and are supported transversely of the axis of the tube. The fabrication of such membranes and their associated supports is difficult to accomplish by heretofore known techniques.

The thickness of a membrane of the type described is determined by its particular application and strength requirements. The strength required to prevent failure is also a function of the area or diameter of the membrane. Thus, a membrane of silicon dioxide with a diameter of about 1 inch may have adequate strength with only one micron of thickness, while a three inch diameter membrane may require a thickness of 10 microns for adequate strength. The strength required depends upon the subsequent processing steps to be carried out on the membrane, and whether the membrane must provide support, in operation, for additional layers of mosaics of material deposited thereon. Thus, where various layers are to be deposited on the membrane and portions of the layers are to be removed, such as by mechanical techniques, the membrane may be subjected to considerable force, making it desirable to have substantial strength to prevent rupture of the membrane. This has heretofore placed a limitation on the minimum thickness with which many membranes could be fabricated. This limitation is undesirable, since it is generally preferable to have as thin a membrane as possible.

It is therefore an object of the present invention to provide an improved method for fabricating a thin membrane supported at its periphery by a mounting frame.

Another object of the invention is to provide a method for fabricating a membrane assembly in which additional layers of mosaics may be deposited on the membrane and in which membrane thickness is minimized.

A further object of the invention is to provide a method for fabricating a membrane assembly in which the membrane may be made very thin, yet the membranes may be subjected to relatively severe mechanical forces during the fabrication without damage.

It is another object of the invention to provide an improved membrane assembly.

Other objects of the invention will become apparent to those skilled in the art from the following description taken in connection with the accompanying drawings wherein.

Very generally, the method of the invention includes the depositing, in a vacuum, of a continuous layer of material on a continuous substrate to form a substrate-membrane laminate. A mounting frame is secured to the substrate-membrane laminate on the membrane side thereof to surround one surface of the membrane at its periphery. The substrate is then etched away with a substance which is compatible with the membrane and the frame materials to leave the membrane supported by the frame.

Figure 1:
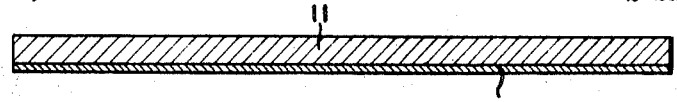
FIGS. 1 to 3 illustrate successive steps in practicing the method of the invention, FIG. 3 also illustrating a membrane assembly constructed in accordance with the invention.

Referring now more particularly to FIG. 1, a substrate 11 is placed in a vacuum and is coated by a material, described below, to form a membrane 12. The material of the substrate should be one which can be etched away in a chemical bath which does not dissolve or etch the membrane material significantly. Most of the common metals can be used as substrates when the membrane is an inorganic dielectric. Aluminum is a preferred substrate, as it can be removed with a solution of sodium hydroxide or potassium hydroxide, which does not weaken most of the inorganic dielectrics. Copper and copper alloys, such as beryllium copper, Phosphor bronze, and nickel are useful, but require acidic etchants. Accordingly, membranes which are substantially soluble in acids cannot be used with these substrates. Another possible combination is a copper substrate and a membrane formed of aluminum. The copper may then be etched away with ferric chloride, which does not dissolve the aluminum.

The chemical bath in which the laminate is immersed for removal of the substrate most often contains a liquid etchant, but vapor phase etchants, or a mist of liquid droplets may be used. The removal of some substrates may be expedited by electrolysis.

The membrane material may be an inorganic dielectric, or a metal, or an inorganic semiconductor material, depending on the application. The materials used must have adequate strength and must be resistant to the chemical bath used to etch away the substrate. Depending upon the application, the material may also be selected to have a desired dielectric constant, coefficient of expansion, specific heat, or other property.

Membranes may be made from metals, the inorganic metal salts, and the metal chalcogenides. Materials of greatest utility in the dielectric and semiconductor class are the metal oxides and the inorganic metal salts. Tough strong membranes can be made from silicon-dioxide, silicon monoxide, and silicon nitride. Other materials of sufficient strength to be useful include zinc sulphide, aluminum oxide, iron oxide, magnesium fluoride, magnesium oxide, nickel oxide, tantalum oxide and tin oxide. Tin oxide is useful as an inorganic semiconductor.

The membrane 12 is deposited on the substrate 11 in a vacuum by evaporation and condensation or by sputtering. Those materials which do not decompose at temperatures of 1500° to 2000° C. may generally be evaporated and condensed. It is preferable that the vapor pressure of the membrane material be at least about $10^{-2}$ Torr at the evaporation temperature and that it not decompose at the evaporation temperature. Materials which decompose under such conditions may be deposited by sputtering. Although vacuum evaporation and condensation is the preferred coating method, other methods may be used with some materials. For example, electroplating may be used if the membrane material is metallic, and flow coating or dip coating may be used if the material of the membrane can be melted at a convenient temperature.

Figure 2:
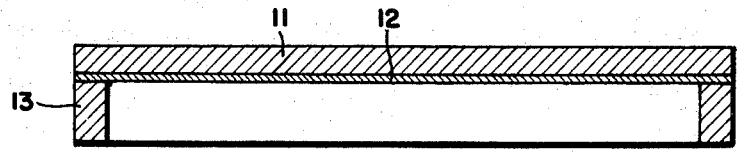

After depositing the membrane 12 on the substrate 11, an annular frame 13 is secured to the substrate-membrane laminate preferably on the membrane side thereof as shown in FIG. 2. If secured to the substrate side of the membrane-substrate laminate, the portion of the substrate under the frame will be protected from the etchant when the substrate is etched away as described below. Although some undercutting may result, this can be reduced by appropriate masks. In a typical cathode ray tube, the tube cross section is circular and, consequently, the mounting frame 13 is circular in outline. The frame is located on the substrate-membrane laminate so that at least a portion of the membrane completely occupies the area defined by the annular frame.

The mounting frame may be of any convenient material which has the required mechanical and thermal properties for providing the necessary structural support under operating conditions in the tube. In addition, it is convenient if the material of the mounting frame is not soluble in the etching substance as it is unnecessary to mask such materials during etching. A preferred material is glass, which may be attached to the membrane-substrate laminate by frit or "solder glass." The frame may, alternatively, be of copper, nickel, stainless steel, or of one of the alloys commonly used for glass to metal seals, if the etching substance is nonreactive therewith, such as if the etching substance is a hydroxide solution.

Figure 3:
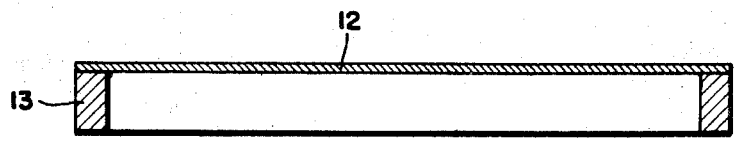
Figure 4:
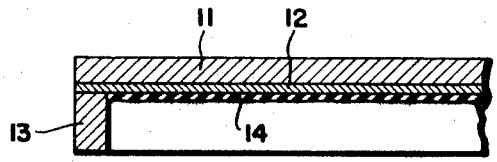
FIGS. 4 through 8 are illustrative of further steps which may be practiced in connection with the method of the invention.

After the support frame 13 is attached to the substrate-membrane laminate, the entire assembly is immersed in a bath of an etching substance and the substrate 11 is etched away. The result is a continuous membrane held in secure support by the frame at the periphery of the membrane, as shown in FIG. 3. For convenience, it is preferable that the substrate, and hence the membrane, be the same outer diameter as the frame. However, it may be preferable in some cases that the frame be a smaller diameter, and the excess membrane may be trimmed off after etching in such a case.

The following is a list of combinations of some materials which are satisfactory for use in practicing the method of the invention:

are listed in the Appendix "The Deposition Characteristics and Refractive Indices of a Range of Inorganic Compounds" from the book "Vacuum Deposition of Thin Films" by L. Holland, published by John Wylie & Sons Inc., 1961. A deposition technique which produces useful silicon dioxide films is to place granulated silicon monoxide in a tantalum boat, and heat it to a temperature of about 1900° C. in an atmosphere of oxygen at the reduced pressure stated before.

In order to achieve good adhesion and a strong continuous membrane, it is frequently desirable to heat the substrate during deposition. For example, when depositing silicon-dioxide on an aluminum substrate, good results can usually be obtained by maintaining the substrate at a temperature above 100° C. and below 600° C. during deposition. It is preferable to maintain the aluminum at about 300° C. during deposition to achieve the best quality membrane. Heating may be accomplished by an adjacent heater coil or an infrared lamp. Good adhesion is necessary to prevent flaking of the membrane during subsequent handling, such as is discussed below. The temperature of the substrate, of course, is kept well below the temperature at which the membrane material produces significant vapor pressure so that the vapor will condense on the substrate.

Successful results may be achieved with membrane thicknesses as low as 0.05 micron. Membrane thicknesses greater than this may also be utilized, but since glass sheets of about 50 microns and greater in thickness may be readily purchased at low cost, it is generally not economical to exceed about 50 microns membrane thickness. The exact thickness of the membrane is determined by the particular application in which it is used. Generally speaking, the most desirable result is the thinnest possible membrane which provides adequate strength. As previously mentioned, the strength required is a function of the area or diameter of the membrane, the subsequent processing steps such as are discussed below and whether the membrane must provide support for, or is supported by, additional layers or mosaics deposited thereon. When a layer is to be added to the membrane which is continuous and strong, the membrane per se may be reduced in thickness. When the added layers are to consist of mosaics of discrete elements, the membrane is made thicker. The diameter of the membrane also depends upon its application. For most purposes, diameters in the range of about 1 inch to 3 or 4 inches are typical, but some diameters may be greater or less.

By fabricating a membrane and mounting frame assembly as described, subsequent processing steps may be per-

| Substrate | Frame | Membrane | Etchant |
|---|---|---|---|
| Aluminum or magnesium. | Glass or nickel | Silicon dioxide or silicon nitride. | Sodium hydroxide or potassium hydroxide. |
| Copper or beryllium copper. | Glass or stainless steel. | Aluminum or magnesium. | Ferric chloride or nitric acid. |
| Do. | Glass | Tin oxide | Do. |

In order to achieve successful vacuum deposition of evaporated materials, residual gas pressure within the vacuum chamber should be less than about 10⁻⁵ Torr. The material which is to form the membrane may be placed in a small open-topped container or crucible, sometimes called a boat, and is heated by suitable means such as by passing an electric current through the metal of the boat, through an adjacent heater coil surrounding the boat, or through a heater coil within the boat and immersed in the membrane material itself. The material which is to form the membrane, when placed in the boat, is generally in granulated form. When the material is heated sufficiently, evaporation or sublimation of the material occurs and the evaporated material subsequently condenses on the cooler surfaces inside the chamber, including the substrate which is to be coated. The material of the boat and the heater coil must be compatible with the membrane material. Various deposition techniques for materials of different kinds, which are known to be effective, formed on the membrane before the substrate is removed, during which steps the substrate provides support to prevent damage to the membrane. The substrate should be strong and rigid to withstand the rigors of subsequent processing, including mechanical scrubbing, and is made relatively thick for this purpose. By making the substrate optically flat and highly polished, the membrane remaining after etching is also made flat and polished, and of uniform thickness. By using a metallic substrate, the substrate may be heated during the evaporation of the membrane material to provide a superior bond and cohesion in the membrane. The subsequent processing may be employed to provide a coating of further material in a discontinuous pattern. Moreover, the coating may be of a material which is incapable of retaining its shape without the support of the membrane.

Referring now to FIGS. 4 through 8, a particular process which may be carried out in connection with the method of the invention is illustrated. The modification illustrated in FIGS. 4 through 8 is for producing a membrane having desired secondary electron emission characteristics and superior charge storage properties, for use as an electrostatic image storing target in a cathode ray tube. The secondary emitting material is the material of the membrane itself, for example, silicon dioxide, separated into a fine pattern of tiny islands isolated from each other by narrow strips of copper.

Figure 5:
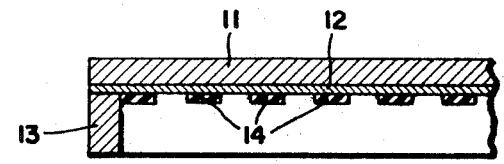

To carry out the process illustrated in FIGS. 4–8, a flat polished sheet of aluminum is supported in a vacuum chamber and a layer of silicon dioxide is deposited on it by evaporation and condensation to a thickness of about 12 microns. The substrate-membrane laminate is then bonded to a glass support ring with frit. The silicon dioxide side is then coated with a photo-sensitive etch-resistant material, and is exposed to an image of a photo master corresponding to the desired pattern of islands. Photosensitive etch-resistant materials, commonly known as photo-resists, are commercially available. An example is KPR, offered by the Eastman Kodak Co. The layer of photo-resist is indicated at 14 in FIG. 4. The latent photo-resist image is then developed by removing the unexposed areas of the photo-resist and leaving exposed photo-resist on the regions where islands are desired and bare silicon dioxide in the regions where the strips are desired. This result is shown in FIG. 5.

Figure 6:
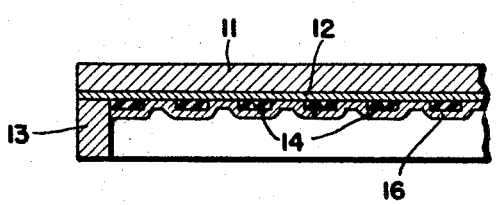
Figure 7:
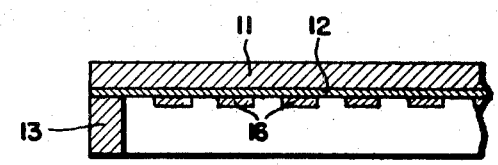

The assembly is then placed back in a vacuum chamber and is coated with a layer 16 of copper by evaporation and condensation. The layer 16 is shown in FIG. 6. The assembly is then removed from the vacuum chamber and soaked in a suitable photo-resist solvent or paint remover and is mechanically scrubbed to remove the photo-resist and the copper overlay thereon from the island areas so that the result is as shown in FIG. 7. The membrane is firmly supported by the substrate during the scrubbing, and may be thoroughly scrubbed without damage. The copper deposited on the bare silicon dioxide remains adhered so that a grid of copper is left and many tiny islands of bare silicon dioxide are positioned between the copper strips.

Figure 8:
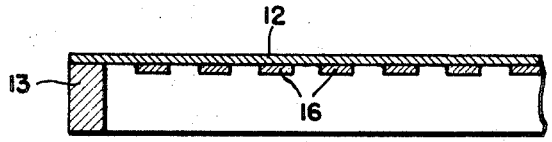
Figure 9:
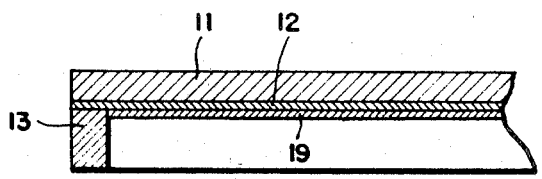
FIGS. 9 through 14 are illustrative of an alternate series of steps which may be practiced in connection with the method of the invention.

The substrate 11 is then removed by etching with an aqueous solution of sodium hydroxide to produce the result shown in FIG. 8. When the membrane assembly is used as a storage target in a cathode ray tube, electrostatic charges placed on the islands of silicon dioxide by an electron gun of the cathode ray tube cannot migrate from one island to the other because of the conductive copper grid between. Thus, storage images do not "spread" to adjacent areas, even after long storage intervals.

Figure 10:
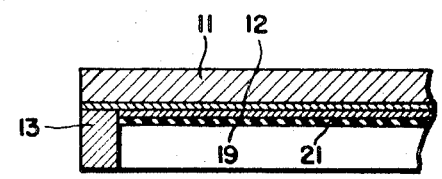
Figure 11:
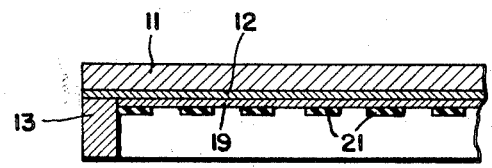
Figure 12:
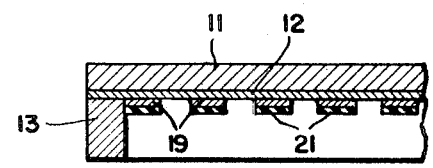
Figure 13:
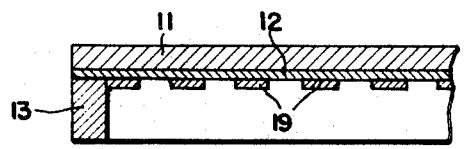
Figure 14:
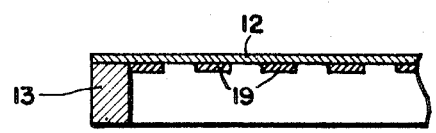

Referring now to FIGS. 9 through 14, a further modification of the method of the invention is illustrated. The method modification illustrated in FIGS. 9 through 14 for producing a structure similar to that shown in FIG. 8. A structure such as that shown in FIG. 2 is placed in a vacuum chamber and chromium is evaporated and deposited in a layer 19 (FIG. 9) on the silicon dioxide side. The laminate is then removed from the chamber and coated with photo-resist 21 over the copper layer 19. The photo-resist 21 is shown in FIG. 10. The photo-resist is then exposed to an actinic image of a photo master representing the desired pattern of closely spaced dots or "islands." The latent photo-resist image is then developed, such that the unexposed photo-resist is washed off of the chromium substrate in the regions where strips are desired. This is illustrated in FIG. 11. The chromium layer is then etched in a solution of hydrochloric acid to remove the exposed chromium in strips such that the silicon dioxide layer is bare in the region of the desired strips. This is shown in FIG. 12. The remaining photo-resist is then removed by the use of a photo-resist solvent or paint remover aided by mechanical scrubbing. This exposes the remaining chromium as shown in FIG. 13. The aluminum substrate is then etched away in a solution of sodium hydroxide, resulting in a very smooth, flat taut membrane of the dielectric silicon dioxide, supported on the glass ring 13, and supporting the plurality of tiny closely spaced but individually insulated islands of chromium (FIG. 14).

The method of the invention, with modifications, is useful in many other applications in addition to those mentioned above. For example, in image orthicon tubes, a silicon dioxide membrane produced in accordance with the invention may be used as the dielectric target. Since extremely thin membranes may be produced in accordance with the invention, the resolution and the output signal level in such a tube may be increased. In addition, the application of mosaics of material having high secondary emission ratios to the side of the membrane near the photocathode is readily possible in accordance with the invention, affording a further increase in sensitivity.

In the type of tube known as a secondary electron conduction tube, the target is a thin insulating film of aluminum oxide, laminated to a thin conducting film of aluminum and coated with a layer of potassium chloride. The method of the invention may be readily employed to construct such a membrane assembly.

Tubes employing storage surfaces, such as scan converter tubes and dark trace storage tubes, employ targets having layers of material for the purpose of storing information in various ways. The method of the invention may be readily employed to construct membranes having such surfaces. For example, a dark trace image storage tube employs a layer of scotophor to store an optical image and a layer of resistive material to enable the elevation of temperature and the consequent erasure of dark traces on the scotophor layer. Because the method of the invention enables the production of extremely thin layers, the thermal response is faster, enabling erasure within a few milliseconds, because of low thermal inertia.

A further use for the method of the invention is in the construction of windows in particle accelerators. Particle accelerators, such as cyclotrons, often are fitted with thin strong "windows" which keep air out of the evacuated accelerator chamber, but which permit high velocity particles to exit the chamber by penetration of the membrane of the window. Such window membranes may be made by the method of the present invention.

As indicated in the method modifications described in connection with FIGS. 4 through 8, and FIGS. 9 through 14, the production of certain types of membrane assemblies involves fairly severe handling of the membrane. For example, mechanical scrubbing typically necessary to remove photo-resistive material exerts substantial force on the membrane itself. In accordance with the method of the invention, these operations may be carried out while the membrane is still firmly bonded to a rigid and strong substrate. Thus, the likelihood of rupturing the membrane is minimal.

It may therefore be seen that the invention provides a method for fabricating a very thin membrane supported at its periphery by a mounting frame. Further operations may be performed on the membrane without the likelihood of causing damage thereto. In addition, the invention provides an improved membrane assembly wherein the membrane is extremely thin and is supported by a frame surrounding the membrane at the periphery thereof.

Various modifications of the invention in addition to those shown and described herein will become apparent to those skilled in the art from the foregoing description and accompanying drawings. Such modifications are intended to fall within the scope of the appendant claims.

What is claimed is:

1. A method for fabricating a thin flat membrane supported at its perphery by an annular mounting frame, comprising, depositing, in a vacuum, a continuous thin layer of a material on a continuous substrate to form a substantially planar substrate-membrane laminate, securing an annular mounting frame to the substrate-membrane laminate with at least a portion of the laminate completely occupying the area defined by the annular mounting frame, and etching away the substrate with a substance which is compatible with the membrane and the frame materials to leave the membrane supported by the frame.

2. A method according to claim 1 wherein, prior to etching away the substrate, further material different from the membrane material is deposited on the substrate-membrane laminate on the membrane side thereof, at least some of such further material being compatible with the etching substance.

3. A method according to claim 2 wherein said further material includes a photo-sensitive etch-resistant material and a metal in stated order, wherein parts of the photo-sensitive etch-resistant material are exposed and unexposed parts removed prior to depositing the metal, and wherein the exposed photo-sensitive etch-resistant material and the metal overlaying said exposed material are removed prior to etching away the substrate.

4. A method according to claim 2 wherein said further material includes a metal and a photo-sensitive etch-resistant material in stated order, wherein parts of the photo-sensitive etch-resistant material are exposed and the unexposed parts removed, wherein the metal is removed in the areas not covered by exposed photo-sensitive etch-resistant material, and wherein the exposed photo-sensitive etch-resistant material is then removed, all prior to etching away the substrate.

5. A method according to claim 2 wherein said further material is of high secondary emission ratio and is deposited in a mosaic-like pattern.

6. A method according to claim 2 wherein said further material is an inorganic metal salt.

7. A method according to claim 2 wherein the membrane material is transparent, and wherein the further material includes a transparent resistive coating and a scotophor material.

8. A method according to claim 1 wherein the substrate is heated during deposition of the membrane material.

9. A method according to claim 1 wherein the membrane is deposited to a thickness of between 0.05 micron and 50 microns.

10. A method according to claim 1 wherein the substrate is aluminum, wherein the membrane material is silicon dioxide, wherein the support frame is glass, and wherein the etching substance is sodium hydroxide.

11. A method for fabricating a membrane assembly comprising a mounting frame, a thin continuous membrane supported by the frame, and a layer of useful material supported by the membrane, comprising the steps of: depositing a continuous thin layer of membrane material on a continuous metallic substrate to form a continuous substrate-membrane laminate; forming a layer of useful material on one surface of the membrane by a process requiring the application of force to the membrane while the other surface of the membrane is supported by the substrate; securing a mounting frame to the laminate at the periphery thereof; and etching away the substrate with a substance which does not etch the materials of the membrane assembly.

12. The method of claim 11 wherein: the substrate is thicker, stronger, and more rigid than the membrane, whereby the laminate may be subjected to processes during the formation of the useful layer which the unsupported membrane could not withstand; and the thickness of the membrane is between .05 and 50 microns.

13. The method of claim 11 wherein the useful layer is comprised of material incapable of retaining its shape without support of the continuous membrane.

14. The method of claim 11 wherein the useful layer is a discontinuous pattern of the useful material.

15. The method of claim 11 wherein the substrate is a flat, polished plate, whereby the membrane is left with a flat, smooth surface after the substrate is etched away.

16. The method of claim 12 wherein the layer of useful material is formed into a predetermined pattern by a photo-etching process, said process including the application and removal of a photo-sensitive etch-resistant material.

17. The method of claim 16 wherein: the substrate is made of aluminum; the membrane is made of an oxide of silicon; the membrane is deposited by evaporation and condensation in a partial vacuum while the substrate is maintained at a temperature above 100° C. and below 600° C.; and the etching substance is an aqueous hydroxide solution.

18. The method of claim 17 wherein the mounting ring is made of glass, and the mounting ring is secured to the membrane side of the laminate with glass frit.

References Cited

UNITED STATES PATENTS

| | | | |
|---|---|---|---|
| 1,654,936 | 1/1928 | Jones | 29—424 |
| 2,083,865 | 6/1937 | Rensink | 29—424 |
| 3,183,567 | 5/1965 | Riseiman | 29—604 |
| 3,325,881 | 6/1967 | Engelking | 29—625 |
| 3,392,053 | 7/1968 | Olson | 29—424 |

JOHN F. CAMPBELL, Primary Examiner

D. P. ROONEY, Assistant Examiner

U.S. Cl. X.R.

29—25.11